(12) United States Patent
Fine

(10) Patent No.: US 12,471,047 B2
(45) Date of Patent: Nov. 11, 2025

(54) SYSTEM FOR OPTIMIZING A SINGLE FREQUENCY NETWORK BROADCAST

(71) Applicant: Crown Castle USA, Inc., Canonsburg, PA (US)

(72) Inventor: Allen J. Fine, Sanford, FL (US)

(73) Assignee: Crown Castle USA, Inc., Canonsburg, PA (US)

( * ) Notice: Subject to any disclaimer, the term of this patent is extended or adjusted under 35 U.S.C. 154(b) by 335 days.

(21) Appl. No.: 18/210,235

(22) Filed: Jun. 15, 2023

(65) Prior Publication Data

US 2023/0413205 A1 Dec. 21, 2023

Related U.S. Application Data

(60) Provisional application No. 63/352,357, filed on Jun. 15, 2022.

(51) Int. Cl.
*H04W 56/00* (2009.01)
*H04W 24/08* (2009.01)

(52) U.S. Cl.
CPC ....... *H04W 56/0045* (2013.01); *H04W 24/08* (2013.01)

(58) Field of Classification Search
None
See application file for complete search history.

(56) References Cited

U.S. PATENT DOCUMENTS

2016/0366605 A1* 12/2016 Tsui ............... H04W 24/08
2022/0377587 A1* 11/2022 Abedini .......... H04W 24/10

\* cited by examiner

*Primary Examiner* — Walter J Divito
(74) *Attorney, Agent, or Firm* — Blank Rome LLP

(57) ABSTRACT

An automated system and method for optimizing a single frequency network (SFN), such as a television broadcast network, that has network transmitters which simultaneously broadcast a same time-synchronized signal over a same frequency over a coverage area. In the system, remote monitoring stations are distributed in the coverage area. A network analyzer of each station is configured to measure time and amplitude measurements from each of the transmitters. A remote communication interface on each station transmits the time and amplitude measurements. A network communication interface requests and receives the transmitted time and amplitude measurements from he stations. The network server identifies one or more of the transmitters as a source of time-delay interference and self-heals to mitigate the interference, such as by applying one or more launch delays to the transmitters.

20 Claims, 7 Drawing Sheets

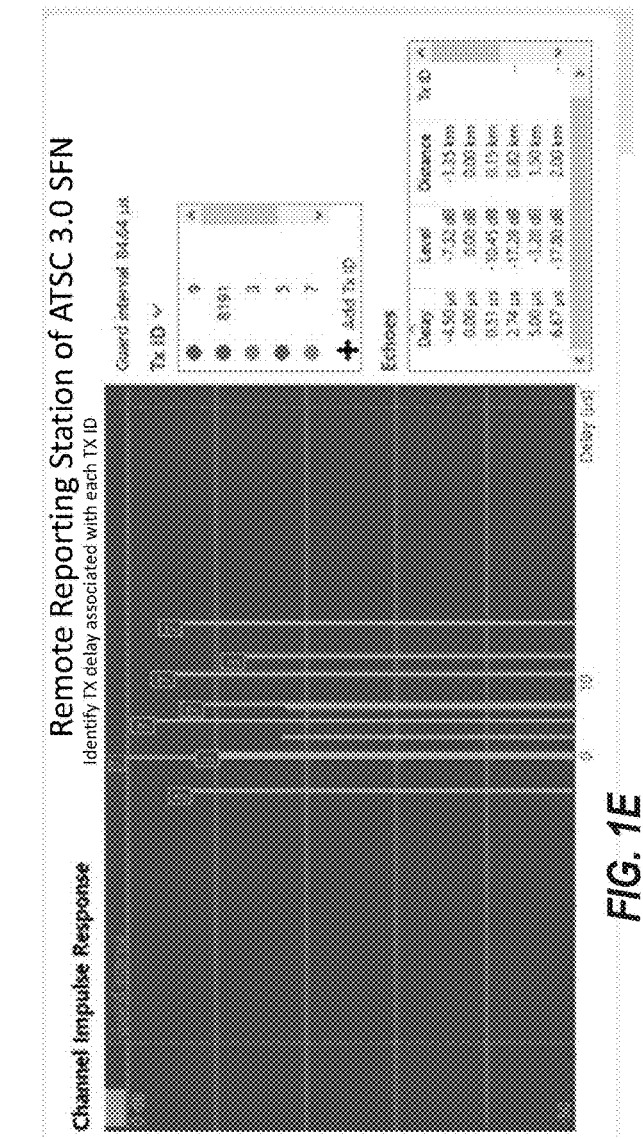
FIG. 1E
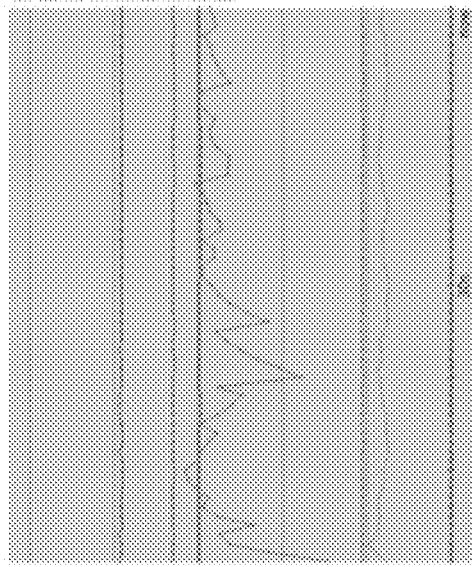
FIG. 1B
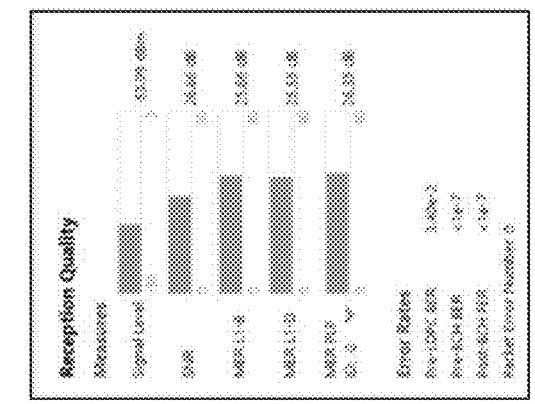
FIG. 1C
FIG. 1D

SYSTEM FOR OPTIMIZING A SINGLE FREQUENCY NETWORK BROADCAST

CROSS-REFERENCE TO RELATED APPLICATION

This application claims the benefit of U.S. Provisional Application Ser. No. 63/352,357 filed on Jun. 15, 2022, and entitled Real-Time Automated Measurement System for ATSC 3.0 Network, the subject matter of which is herein incorporated by reference.

FIELD OF THE DISCLOSURE

The subject matter of the present disclosure is directed to a system and method for optimizing the digital transmission or broadcast of a single frequency network, such as the ATSC 3.0 Network, by using a real-time automated monitoring and measurement system for maintaining time synchronization of the single frequency network.

BACKGROUND OF THE DISCLOSURE

Advanced Television Systems Committee ("ATSC"), Inc. is an international, non-profit organization developing voluntary standards for digital television transmission. The ATSC member organizations represent the broadcast, broadcast equipment, motion picture, consumer electronics, computer, cable, satellite, and semiconductor industries. The ATSC 3.0 (a.k.a. NextGen TV) standards were developed to provide improved performance and new features to the North American digital television market. These new features include greatly improved mobile reception quality and broadcast mobile internet service.

For example, ATSC 3.0 supports both high power—high tower deployments as well as Single Frequency Network (SFN) deployments. A Single Frequency Network (SFN) is made up of two or more transmitters simultaneously broadcasting the same time-synchronized signal over the same frequency to achieve greater signal coverage and reception. SFNs allow broadcasters to more completely "blanket" RF coverage to their target market. Adding second, third, and fourth transmitters in SFN mode in conjunction with a main transmitter can significantly increase signal reception in targeted areas.

ATSC 3.0 networks are broadcast (transmit only) and have no capability of reporting end-user signal quality. Also, time synchronization is key for SFNs to provide good signal quality. If a maximum latency (RF propagation) is exceeded, destructive interference occurs that degrades the signal quality. The challenge then to deploying SFNs is maintaining time synchronization for multiple transmitters, which can have various power levels and antenna centerlines over a large metropolitan service area.

For this reason, the primary occurring problem for SFNs is Time Delay Interference (TDI) caused by an excessive delay in one transmitter's signal due to changing propagation conditions or long distances between sites. It is exceedingly difficult to identify which transmitter is causing interference, when, or where it is occurring.

As noted above, ATSC 3.0 does not provide end-user performance information, and ATSC 3.0 does not monitor signal quality or provide dynamic modulation or code rates. To resolve interference issues, engineers must conduct drive testing in a broadcast area and must manually identify and implement parameter changes.

What is needed is a way to measure performance and to identify and resolve time-delay interference (TDI) in a single frequency network (SFN), such as an ATSC 3.0 simulcast network. The subject matter of the present disclosure is directed to overcoming, or at least reducing the effects of, one or more of the problems set forth above.

SUMMARY OF THE DISCLOSURE

Accordingly, the present disclosure provides an automated system for optimizing a single frequency network broadcast that comprises a plurality of single frequency network transmitters that simultaneously broadcast a same time-synchronized signal over a same frequency to a coverage area; and a plurality of remote monitoring stations distributed at multiple locations in the coverage area, where each station has a network analyzer and a remote communication interface. The network analyzer is configured to conduct time and amplitude transmitter measurements from any of the network transmitters, and each remote communication interface is configured to transmit the transmitter measurements. A network server has a network communication interface configured to request and receive the transmitter measurements from the remote monitoring stations. The network server is configured to identify, based on the transmitter measurements, at least one of the network transmitters as at least one interfering transmitter that is a source of time-delay signal reception for at least one of the remote monitoring stations.

The network server may be configured to recommend parameter changes to one or more of the network transmitters that will mitigate the time-delay interference of the at least one interfering transmitter. In one embodiment, the network server is configured to calculate a time adjustment based on the transmitter measurements to determine a transmitter launch delay and communicate the transmitter launch delay to the plurality of network transmitters, except to the at least one interfering transmitter, associated with signal reception of at least one remote monitoring station, to mitigate the time-delay interference cause be the at least one interfering transmitter. In another embodiment, the network server is configured to determine an adjusted guard interval based on the transmitter measurements and communicate the adjusted guard interval to the at least one interfering transmitter to mitigate the time-delay interference.

In certain embodiments, the time adjustment for determining the adjusted guard interval is based on a comparison of a guard interval setting and the time measurement of the interfering transmitter; the network communication interface is configured to request and receive the transmitter measurements from the remote monitoring stations in real-time; the network analyzer of each remote monitoring station has a broadcast antenna; each remote monitoring station has a modem antenna; each remote monitoring station has a GPS antenna; and/or the network server is configured to analyze trends in the transmitter measurements over time.

The present disclosure may also provide a method for optimizing a single frequency network broadcast, the network comprising single frequency network transmitters that simultaneously broadcast a same time-synchronized signal over a same frequency over a coverage area, the method comprising the steps of measuring time and amplitude measurements from each of the network transmitters using a network analyzer of one or more remote monitoring stations distributed in the coverage area and identifying, based on the time and amplitude measurements, at least one of the network transmitters as at least one interfering transmitter that is a source of time-delay interference in the signal reception of at least one of the remote monitoring stations.

The method may further comprise the step of determining parameter changes to one or more of the network transmitters that will mitigate the time-delay interference of the at least one interfering transmitter.

In some embodiments, the step of measuring time and amplitude measurements from each of the network transmitters is done in real-time; the time and amplitude measurements from the remote monitoring stations are transmitted to a server of the network, which is configured to identify the interfering transmitter; and/or the method further comprises the step of distributing the remote monitoring stations at multiple locations in the coverage area.

In an embodiment, the method further comprises the steps of calculating a time adjustment based on the transmitter measurements to determine a transmitter launch delay; and communicating the transmitter launch delay to the plurality of network transmitters, except to the at least one interfering transmitter, associated with signal reception of at least one remote monitoring station, to mitigate the time-delay interference cause be the at least one interfering transmitter.

In another embodiment, the method further comprises the steps of determining an adjusted guard interval for the at least one of the network transmitters and communicating the adjusted guard interval to the at least one interfering transmitter to mitigate the time-delay interference.

In other embodiments, the step of determining the adjusted guard interval includes the step of comparing a guard interval setting and the time measurement of the interfering transmitter; the method further comprises the step of analyzing trends in the transmitter measurements over time; and/or each of the remote monitoring stations includes a broadcast antenna This summary is not intended to identify essential features of the claimed subject matter, nor is it intended for use in determining the scope of the claimed subject matter. It is to be understood that both the foregoing general description and the following detailed description are exemplary and are intended to provide an overview or framework to understand the nature and character of the disclosure.

BRIEF DESCRIPTION OF THE DRAWINGS

The accompanying drawings are incorporated in and constitute a part of this specification. It is to be understood that the drawings illustrate only some examples of the disclosure and other examples or combinations of various examples that are not specifically illustrated in the figures may still fall within the scope of this disclosure. Examples will now be described with additional detail through the use of the drawings, in which:

FIG. 1B illustrates an example of a remote monitoring station for the disclosed system.

FIG. 1C illustrates a graph of reception quality data measured by the remote monitoring station of FIG. 1B.

FIG. 1D illustrates a graph of trends for the reception quality data compiled by the remote monitoring station of FIG. 1B.

FIG. 1E illustrates a graph of channel impulse responses in a guard interval that identifies transmission delay associated with each transmitter identification.

DETAILED DESCRIPTION OF THE DISCLOSURE

Figure 1A:
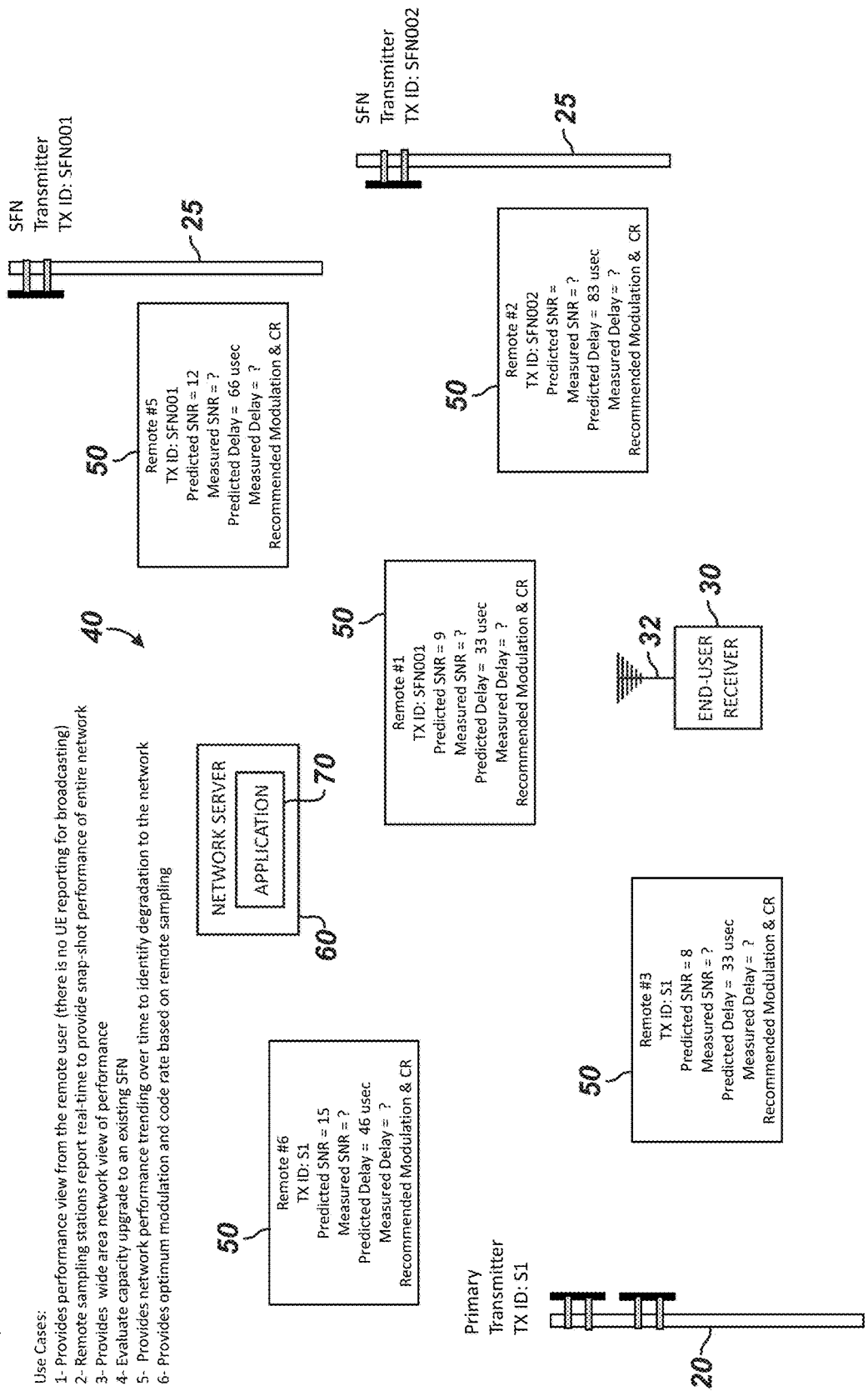
FIG. 1A illustrates a monitoring system having remote monitoring stations for a simulcast single frequency network according to an exemplary embodiment of the present disclosure.

The present disclosure relates to an automated system and/or method for optimizing a single frequency network broadcast, such as a television broadcast network. The system comprises a plurality of single frequency network transmitters that simultaneously broadcast a same time-synchronized signal over a same frequency to a coverage area. A plurality of remote monitoring stations can be distributed at multiple locations in the coverage area, where each station has a network analyzer and a remote communication interface. The network analyzer is configured to conduct time and amplitude measurements ("transmitter measurements") from any of the network transmitters, and each remote communication interface being configured to transmit the transmitter measurements. A network server has a network communication interface configured to request and receive the transmitter measurements from the remote monitoring stations. The network server is configured to identify, based on the transmitter measurements, at least one of the plurality of network transmitters as at least one interfering transmitter that is a source of time-delay signal reception for at least one of the remote monitoring stations The network server may be configured to recommend solutions or parameter changes to one or more of the network transmitters that will mitigate the time-delay interference of the at least one interfering transmitter. In one embodiment, the network server is configured to calculate a time adjustment based on the transmitter measurements to determine a transmitter launch delay and communicate the transmitter launch delay to the plurality of network transmitters, except to the at least one interfering transmitter, associated with signal reception of at least one remote monitoring station, to mitigate the time-delay interference cause be the at least one interfering transmitter. In another embodiment, the network server is configured to determine an adjusted guard interval based on the transmitter measurements and communicate the adjusted guard interval to the at least one interfering transmitter to mitigate the time-delay interference.

It is to be understood that the figures and descriptions of the present disclosure may have been simplified to illustrate elements that are relevant for a clear understanding of the present disclosure, while eliminating, for purposes of clarity, other elements found in a typical wearable assistance device or typical method of using a wearable assistance device. Those of ordinary skill in the art will recognize that other elements may be desirable and/or required in order to implement the present disclosure. However, because such elements are well known in the art, and because they do not facilitate a better understanding of the present disclosure, a discussion of such elements is not provided herein. It is also to be understood that the drawings included herewith only provide diagrammatic representations of the presently preferred structures of the present disclosure and that structures falling within the scope of the present disclosure may include structures different than those shown in the drawings. Reference will now be made to the drawings wherein like structures are provided with like reference designations.

Before explaining at least one embodiment in detail, it should be understood that the inventive concepts set forth herein are not limited in their application to the construction details or component arrangements set forth in the following description or illustrated in the drawings. It should also be understood that the phraseology and terminology employed herein are merely for descriptive purposes and should not be considered limiting.

It should further be understood that any one of the described features may be used separately or in combination with other features. Other invented devices, systems, methods, features, and advantages will be or become apparent to one with skill in the art upon examining the drawings and the detailed description herein. It is intended that all such additional devices, systems, methods, features, and advantages be protected by the accompanying claims.

Referring to the figures, the present disclosure provides a monitoring and measuring system 40 that is configured to optimize the digital transmission or broadcast of a SFN network 10 by maintaining time synchronization of the network's transmitters. In general, the system 40 utilizes remote stations 50 that are receivers/decoders configured to communicate through wireless communication links with a central server architecture 60 of the network 10, as seen in FIG. 1A. As shown, the network 10 includes a transmitter 20 that can be the primary transmitter and several single frequency network (SFN) transmitters 25. The SFN transmitters 25 are configured to simultaneously broadcast the same time-synchronized signal over the same frequency to achieve greater signal coverage and reception.

The monitoring and measuring system 40 of the present disclosure is configured to correct any time-delay interference (TDI) associated with the simulcast transmitters 20, 25 in the network 10 to maintain time synchronization and good signal quality. If a maximum time latency (RF propagation) is exceeded, destructive interference can occur that degrades the signal quality of the network. Accordingly, the system 40 is configured to maintain time synchronization for the multiple transmitters 20, 25, including network transmitters that may have various power levels and antenna centerlines over a large metropolitan service area.

An end-user receiver 30, such as an ATSC 3.0 receiver, of the network 10 is configured to use a "time decoding window" to synchronize signals from the multiple transmitters 20, 25. If any signal received from transmitters 20, 25 falls outside of the time decoding window, the result can be a destructive interference that may result in loss of service or signal quality at the end-user. The ATSC 3.0 standard, for example, provides various settings for adjusting a "Guard Interval" for the transmitters 25, which will allow the "time decoding window" to be increased or decreased. In general, there are a set number (e.g., twelve) of guard intervals available between short (e.g. 192 samples) to long (e.g. 4864 samples). The Orthogonal Frequency Division Multiplexing (OFDM) guard interval can alleviate potential inter-symbol interference arising from the multiple network transmitters. However, adjusting the Guard Interval comes with a trade-off in that the larger the size or increase of the Guard Interval, the lower the data throughput rate of the network. The broadcaster needs to maintain a minimum data throughput rate to maintain service to the end user's receiver 30. For this reason, the broadcaster cannot simply maximize the Guard Interval to eliminate the interference.

To resolve or mitigate this potential time-delay interference, the monitoring and measuring system 40 is configured to provide a "launch delay" to the specific transmitter(s) 25, which synchronizes and normalizes the timing of the SFN transmissions to eliminate any excessive delay. Applying launch delays to the remaining SFN transmitters 25 that are not the source of an unsynchronized time-delay, is beneficial for resolving the time-delay interference because this adjustment or solution has no impact on the data throughput rates.

To do this during broadcast operations, the monitoring and measuring system 40 of the present disclosure is configured to identify the precise timing delay and by which transmitter(s) 25, by making simultaneous measurements from multiple locations throughout the network 10 using the remote monitoring stations 50 at the multiple locations, such as installed on tower locations throughout network 10. The network server or control 60 and a software application or processor 70 are configured to poll (also referred to as "data polling") the remote stations 50. The stations 50 are designed to automatically capture remote digital signal measurements in the network 10 and transfer that measurement data to the network server 60 for processing and analysis.

FIG. 1B shows a schematic view of an example of a remote monitoring station 50 for the system 40. The station 50 can be installed at a fixed location in the broadcast coverage area. The remote monitoring station 50 may include a controller 52, a remote communication interface 54, and a network analyzer 56, such as an ATSC 3.0 Analyzer. Additionally, the station 50 can include a Global Positioning System (GPS) device 57, a router 53, a power supply 51, and the like. All of the components of the station 50 can be housed in an enclosure, such as a NEMA 4-enclosure. The GPS device 57 has a GPS antenna 59 to obtain the GPS coordinates of the station 50 for reporting measurement data. The remote communication interface 54 can be a wireless modem that includes a wireless antenna for communication over a suitable wireless communication channel, such as a cellular network.

The analyzer 56 of each station 50 can have a broadcast antenna 58 to receive broadcast signals from any of the various transmitters 20, 25. In general, the analyzer 56 can measure data regarding the reception quality of the broadcast signal from the network transmitters 20, 25. For example, FIG. 1C shows a graph of reception quality data measured by a remote monitoring station 50 of the disclosed system. The reception quality data can include, for example, signal level, signal-to-noise ratio (SNR), and modulation error ratios (MER L1-B, MER L1-D, MER physical layer pipe (PLP)). The analyzer 56 can also measure error rates, such as bit error ratios (Pre-low-density parity-check code (LDPC) BER, Pre-BCH BER, Post-BCH FER), and packer error number. As a further example, FIG. 1D illustrates a graph of trends for the reception quality data compiled for a remote monitoring station 50 of the disclosed system over time. In measuring the reception quality of the broadcast signal, the analyzer 56 can measure transmission delay associated with each of the transmitters 25. As one example, FIG. 1E illustrates a graph of channel impulse responses in a guard interval. The responses identify transmission delay associated with each transmitter identification.

In the monitoring and measuring system 40 of the present disclosure, the remote monitoring stations 50 are configured to decode the broadcast signal from the transmitters 20, and provide updates on the signal quality and signal strength to the network server 60. This monitoring shows the real-time impact on the SFN network 10 due to optimization and weather conditions. In turn, the network server 60 compiles the measurement data from the remote monitoring stations 50. By doing so, the server 60 collects real-time RF physical layer data for the SFN network 10 and produces a network-wide performance snapshot from the data collected using the remote monitoring stations 50 installed throughout the network's coverage area or footprint.

Using the software application/processor 70, the network server 60 identifies the source and location of interference (which of the transmitters is causing the time delay), and adjusts one or more of the network's SFN transmitter(s) 25 to eliminate the time-delay interference. In particular, the software application 70 is configured to identify locations of the coverage area with poor signal quality and recommend adjustments to network configurations to improve signal quality. For instance, the software application 70 operating on the server 60 can identify potential areas of inter-network interference resulting from the signal latency exceeding a maximum time decoding window for SFN transmissions from two or more transmit locations of the transmitters 20, 25. For a specific channel, the maximum time-decoding windows can be based on Modulation and Coding Rates. With the transmitter site locations, modulation, and code rates identified, the software application 70 then determines the maximum time delay. Mapping by the software application 70 highlights areas where any time-delay interference occurs, based on each specific modulation code rate pair. Prediction of the time-delay interference using the software application 70 can be based on modeling, propagation probabilities, and the like.

In the monitoring and measuring system 40, the software application 70 is configured to then recommend a solution to eliminate the time-delay interference. The solution can be applying a launch delay at specific SFN transmitter(s) 25 (that are not the interfering transmitter) and/or adjusting the size of the Guard Interval window for the specific transmitters 25, which will allow the "time-decoding window" to be increased or decreased. As already noted, adjusting the guard interval may result in a degrading of the network's data throughput rate or may require reducing the modulation to a lower order. For this reason, applying the launch delays of the SFN transmitters 25 in the network 10 may be the preferred solution, but adjusting the size of the Guard Interval can also be performed where appropriate.

The monitoring and measuring system 40 is configured to obtain real-time field test data from multiple locations of the coverage area in order to validate the time-delay interference in the network 10 and to provide a resolution. Collection of real-time field data by the monitoring system 40 is achieved using the multiple remote monitoring stations 50, which can have the ATSC 3.0 decode capabilities, for example, and remote (wireless Internet) connection. When deploying the remote monitoring stations 50 throughout the network 10, a view of the entire network 10 can be attained by the monitoring system 40. This avoids the issue of an adjustment that resolves time-delay interference in one area of the network 10 but moves within the network 10 to degrade another area.

Figure 2A:
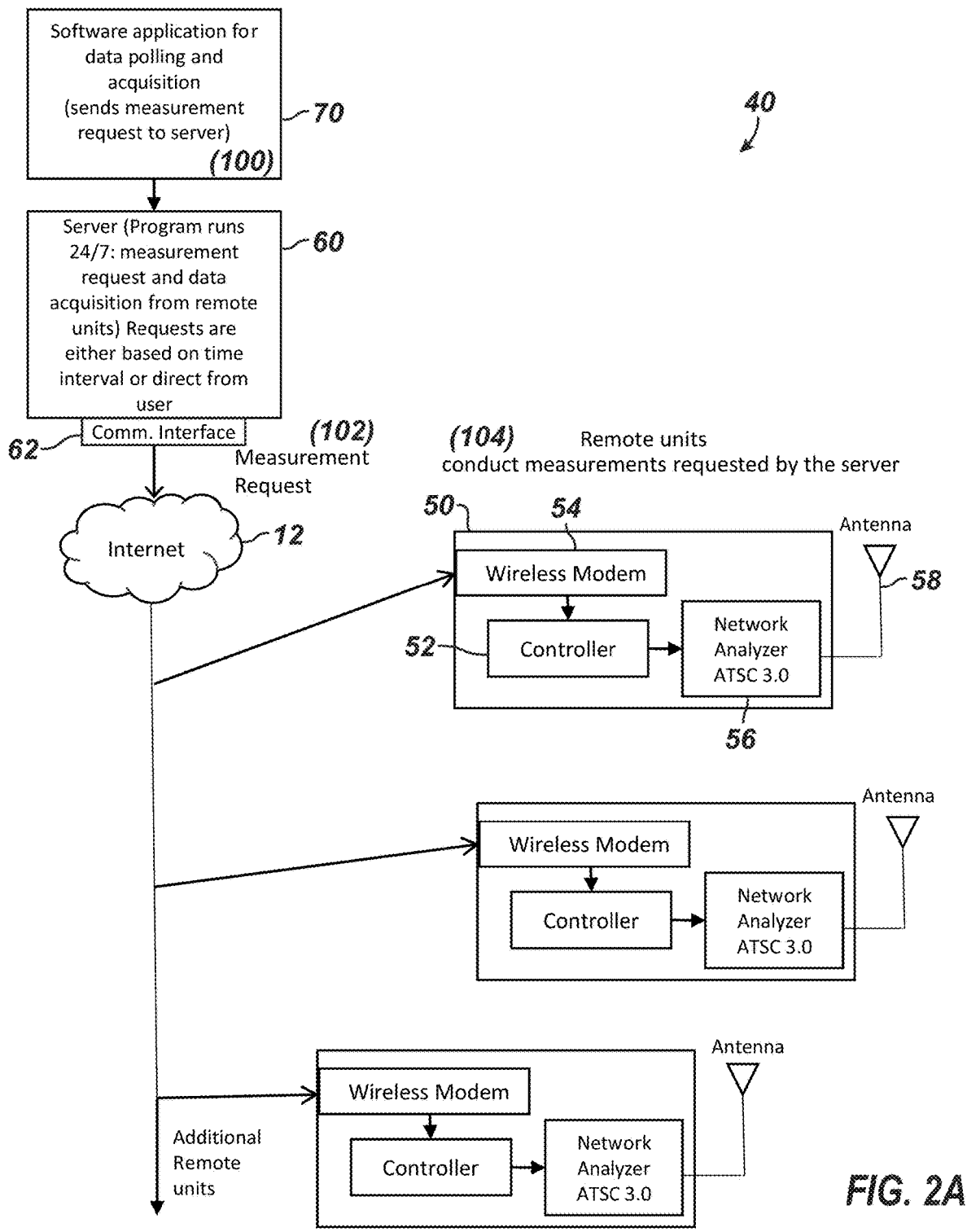
FIG. 2A illustrates the monitoring system requesting the remote monitoring stations to conduct measurements in the simulcast single frequency network.

FIG. 2A illustrates the monitoring and measuring system 40 requesting the remote monitoring stations 50 to conduct measurements in the simulcast single frequency network 10. The system 40 uses the software application 70 for remote control and data acquisition and uses the hardware (stations 50, server 60) to conduct the measurements. As noted previously and again shown in FIG. 2A, each of the remote monitoring stations 50 includes the micro-controller 52, the wireless mode, 54 and the network analyzer 56. The wireless modem 54 provides a continuous internet connection to allow simultaneous readings by the system 40 from all the remote monitoring stations 50. The network analyzer 56 of each station 50 is connected to the broadband antenna 58, which receives the signal, e.g. the ATSC 3.0 signal, from the existing network 10.

In the monitoring process, the system's software 70 for data polling and acquisition sends a measurement request to the server 60 (Block 100). In turn, the server 60 sends a measurement request to each of the remote monitoring stations 50 through the wireless Internet connection 12 (Block 102). The measurement request for data acquisition can be based on specific time intervals or can be directed by the user. The remote monitoring stations 50 then conduct the measurements requested by the server 60 (Block 104). At the stations 50, the network analyzer 56 decodes the broadcast signal from the transmitters 20, 25 and acquires the data as noted previously.

Figure 2B:
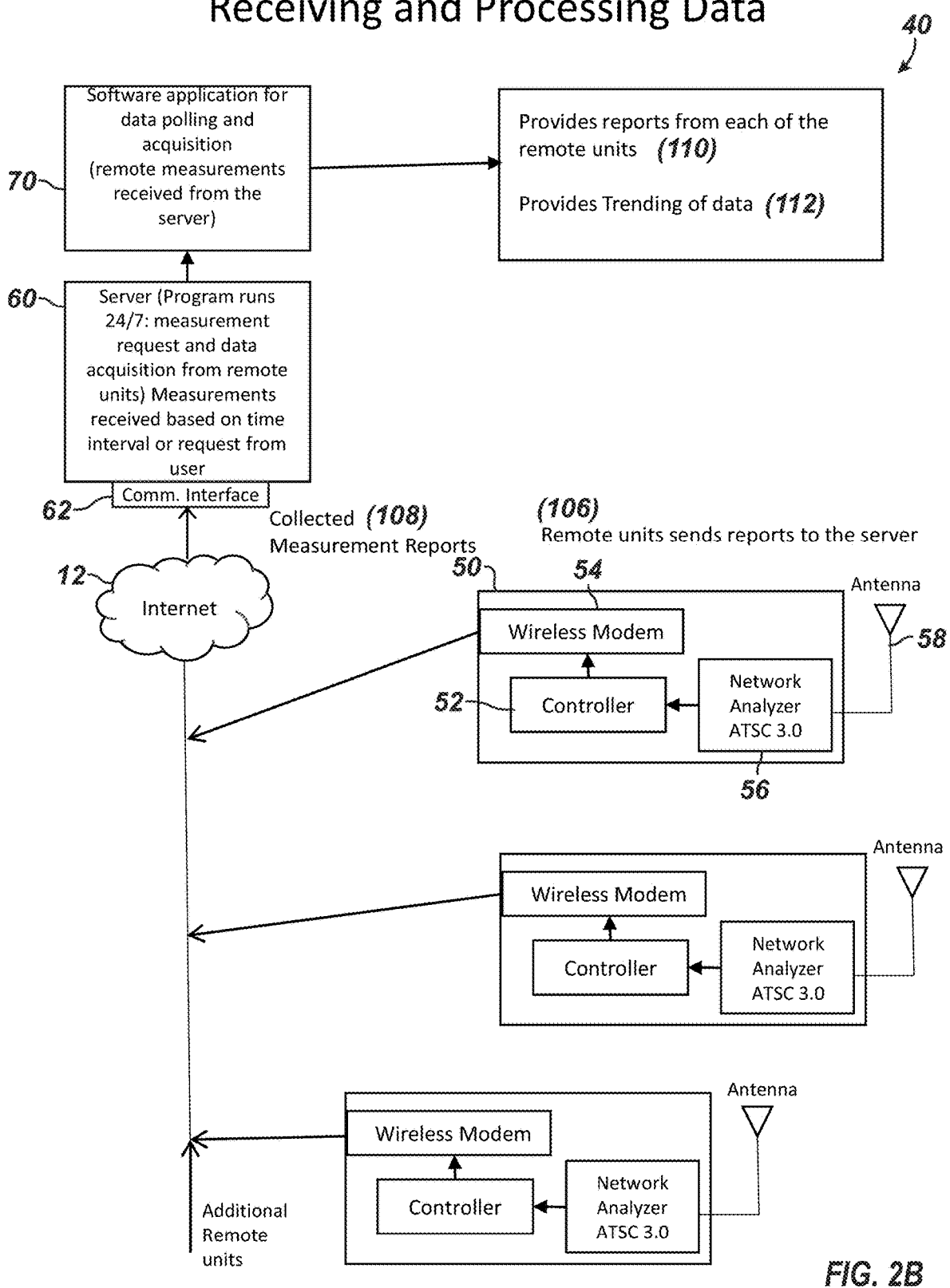
FIG. 2B illustrates the monitoring system receiving and processing measurement data from the remote monitoring stations in the simulcast single frequency network.

FIG. 2B illustrates the monitoring system 40 receiving and processing measurement data from the remote monitoring stations 50 in the network 10. Each of the remote monitoring stations 50 sends the collected measurement data to the server 60 through the wireless Internet connection 12 (Block 106). The server 60 collects the measurement data and time stamps the measurement data received from each of the remote monitoring stations 50 (Block 108). The software application 70 on the server 60 is configured to compile a report(s) with date and time, specific transmitter IDs (e.g. "TX ID: SFN001" or "TX ID: SFN002" of transmitters 25 shown in FIG. 1A), locations, and related data received from each of the remote monitoring stations 50 (Block 110). The application 70 is configured to then analyze trends in the data over time, identify interference, and make recommendations for parameter changes for the network transmitters 25 (Block 112).

Figure 3A:
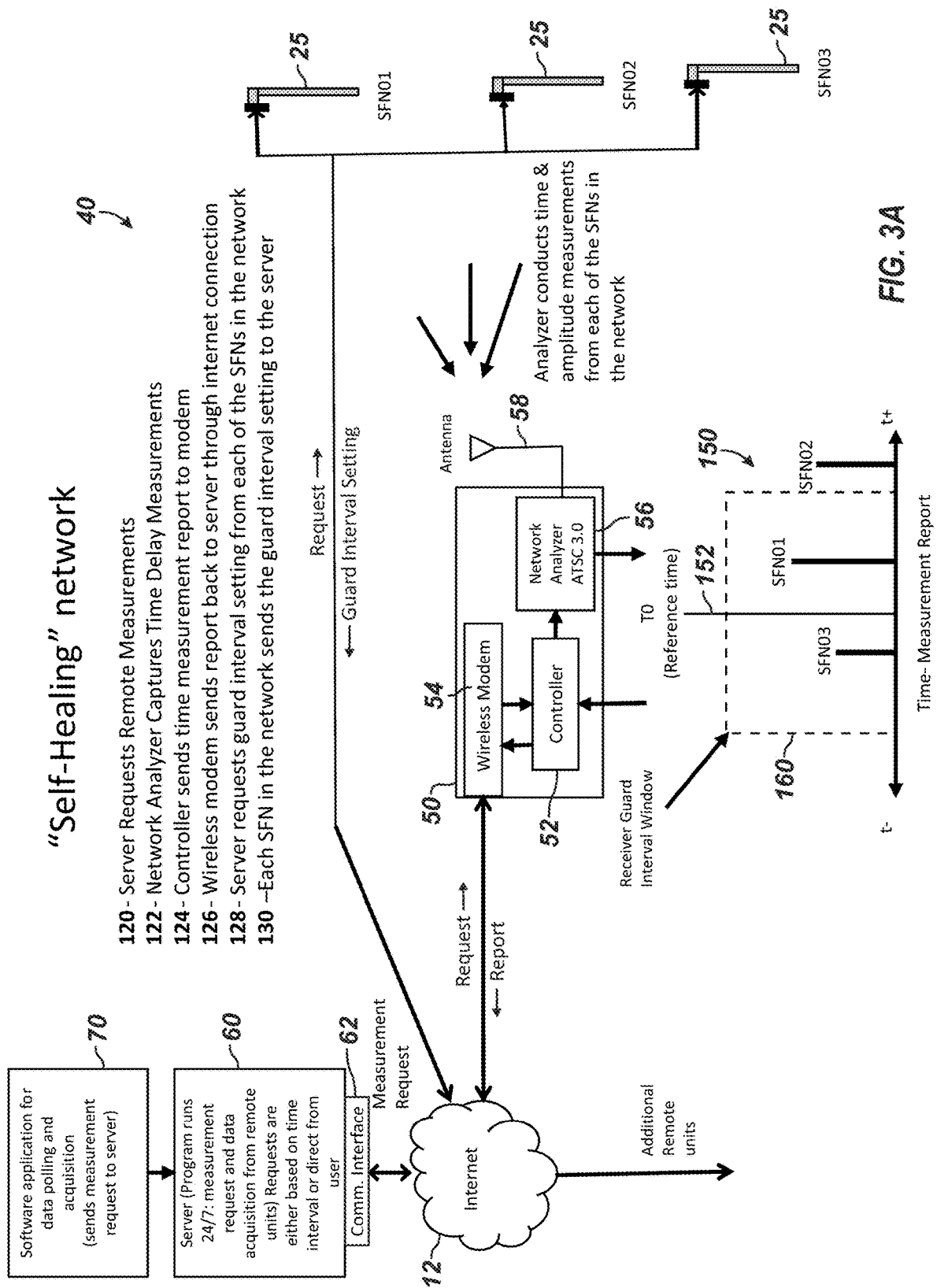
FIG. 3A illustrates the monitoring system in a first stage of correcting the simulcast single frequency network.
Figure 3B:
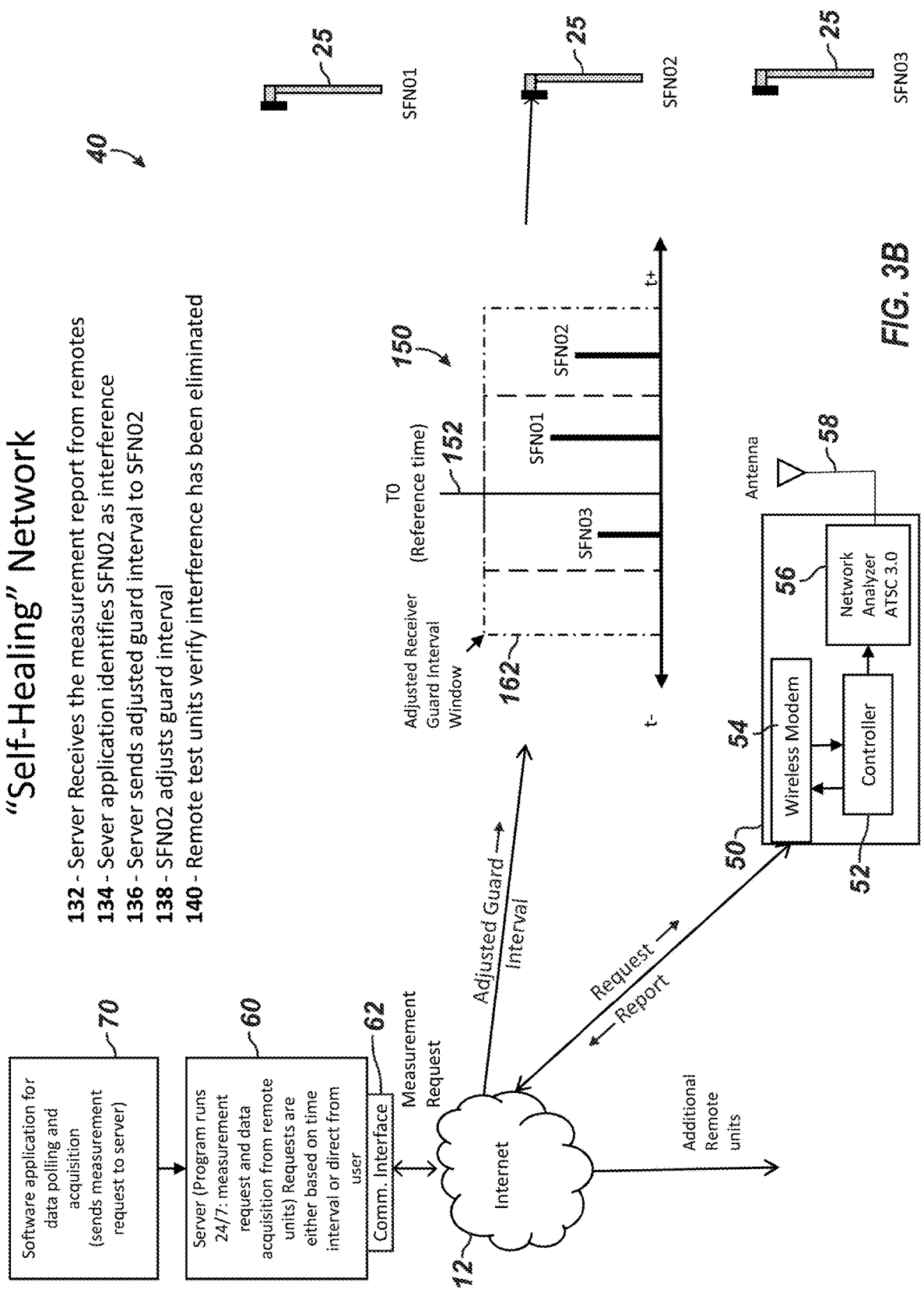
FIG. 3B illustrates the monitoring system in a second stage of correcting the simulcast single frequency network.

FIGS. 3A and 3B illustrate the monitoring and measuring system 40 in stages of correcting any time-delay interference detected in the network 10. The system 40 is designed to make the network 10 "self-healing" in the sense that the remote monitoring stations 50, the server 60, and software 70 can automatically resolve time-delay interference, which can restore lost network service or quality.

As shown in FIG. 3A, the server 60 requests remote measurements from the remote monitoring stations 50 using a network communication interface 62 (Block 120). As noted, the communication interface 62 of the network server 60 can use a wireless Internet connection 12. The network analyzer 56 of each polled station 50 captures time-delay measurements (Block 122). In particular, the network analyzer 56 measures each of the IDs of the SFN transmitters 25 and their associated time delay in the signal reception of the antenna 58 by conducting time and amplitude measurements (also referred to as "transmitter measurements") of the received signals from each of the associated SFN transmitters 25. The controller 52 in the remote monitoring station 50 then sends the transmitter measurements data to the server 60 through the wireless internet connection 12. In particular, the controller 52 sends a time and/or amplitude measurement report to the modem 54 (Block 124), and the wireless modem 54 sends a report back to the server 60 through the internet connection 12 (Block 126).

The server 60 then requests guard interval parameters from each of the SFN transmitters 25 of the network 10 in the broadcast area using the network communication interface 62 (Block 128). Each SFN transmitter 25 in the network 10 sends the guard interval setting to the server 60 (Block 130). The software application/processor 70 receives the data through the internet connection 12 and then compares the requested guard interval settings with the time-delay measurements. The application/processor 70 then analyzes whether the time delay from any transmitter 25 falls outside of the guard interval setting or window, then the monitoring and measuring system 40 identifies that transmitter 25 as producing interference (also referred to an the "interfering transmitter") in the report.

For example, in the inset graph of FIG. 3A, a Receiver Guard Interval Window is shown relative to a time-measurement report for the different SFN transmitters (e.g. SFN01, SFN02, SFN03). As seen in the graph, the SFN transmitter SFN02 falls outside the guard interval and is causing interference. As such, the monitoring system 40 identifies this particular network transmitter SFN02 as the interfering transmitter causing the interference.

Continuing with the process as shown in FIG. 3B, the server application 70 receives the measurement reports from the remote monitoring stations 50 (Block 132). As noted, the system 40 can resolve time-delay interference by adjusting the size of a Guard Interval Window and/or by applying a launch delay at certain SFN transmitter(s) 25 to sync them with the interfering transmitter(s) causing the delay.

In one configuration shown in FIG. 3B, the server application or processor 70 identifies an interfering transmitter 25 (e.g., SFN02) and uses the time delay measured from the interfering transmitter 25, as compared to the set guard interval, to calculate an adjusted guard interval (Block 134). The server application 70 then sends the adjusted guard interval to the subject transmitter 25 (SFN02) (Block 136), and the subject transmitter 25 (SFN02) adjusts its guard interval (Block 138) accordingly to correct the signal latency. In the end, the remote monitoring station(s) 50 then re-checks the delays to verify the interference issue has been mitigated or resolved (Block 140).

In the inset graph of FIG. 3B, an adjusted Receiver Guard Interval Window is shown relative to the previous window on the time-measurement report for the different SFN transmitters (SFN01, SFN02, SFN03). The SFN transmitter SFN02 now falls inside the adjusted guard interval after the monitoring and measuring system 40 resolves the interference as described above.

Figure 3C:
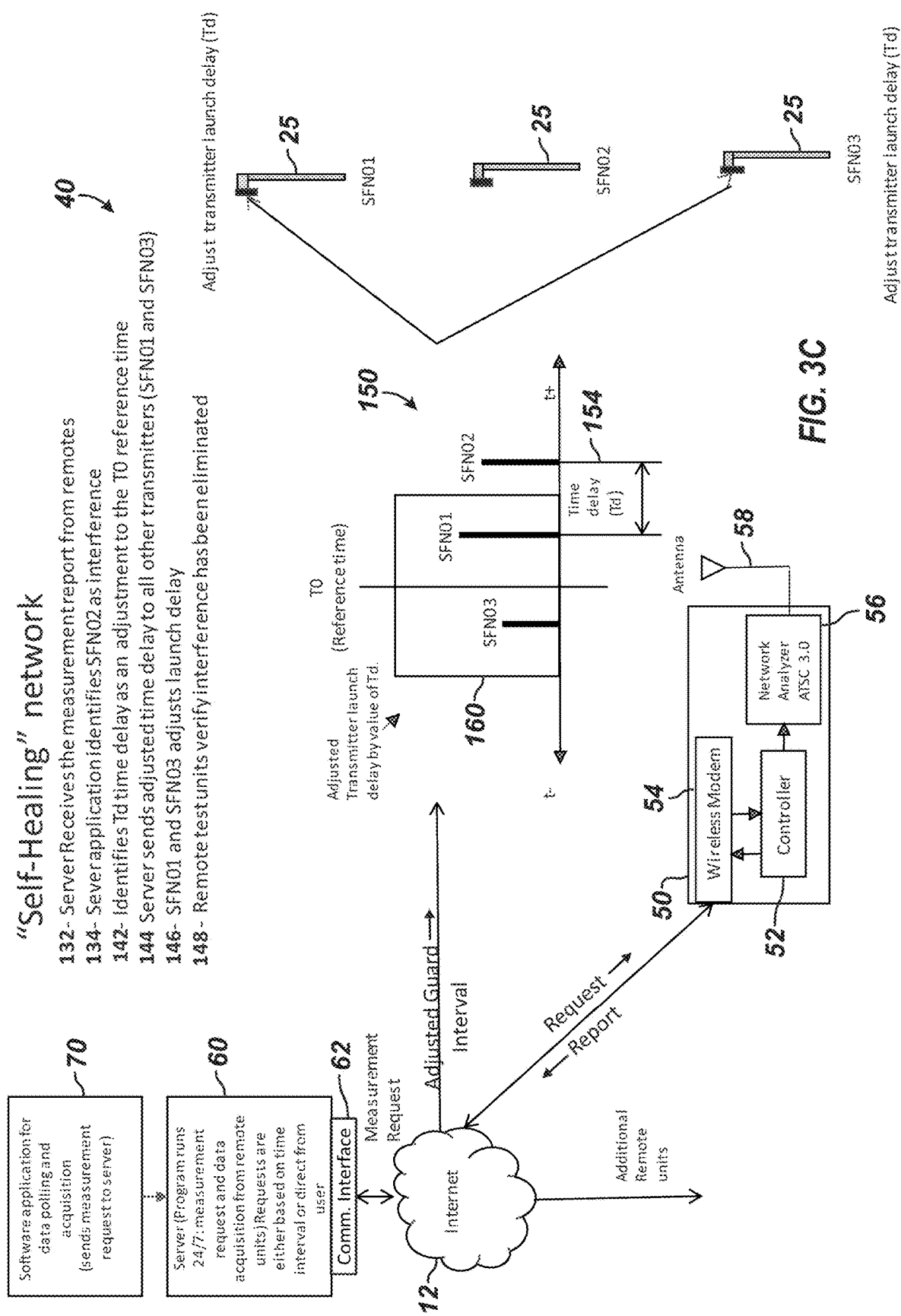
FIG. 3C illustrates the monitoring system in an alternative second stage of correcting the simulcast single frequency network.

In another configuration shown in FIG. 3C, the server application 70 receives the measurement report from the remote monitoring station 50 (Block 132). The server application identifies an interfering transmitter 25 (e.g., SFN02) (Block 134) and uses the time delay measured from the interfering transmitter 25 to calculate a transmitter launch delay adjustment for the remaining non-interferer transmitters 25 (Block 142). In particular, the server application is configured to calculate the time delay Td needed as an adjustment to the TO reference time, and the server application 70 then sends the adjusted time delay to all other transmitters 25 (e.g. SFN01 and SFN03) (Block 144). These other transmitters 25 (e.g., SFN01 and SFN03) adjust their launch delay (Block 146) accordingly, and the remote monitoring station 50 then re-checks the delays to verify the interference issue has been resolved (Block 148).

In the inset graph of FIG. 3C, an adjusted transmitter launch delay Td is shown relative to the time-measurement report for the different SFN transmitters (SFN01, SFN02, SFN03). In general, a new timing reference TO value is produced by the adjustment.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

As used in this specification and the appended claims, the singular forms "a", "an" and "the" include plural referents, unless the context clearly dictates otherwise. Similarly, the adjective "another," when used to introduce an element, is intended to mean one or more elements. The terms "comprising," "including," "having" and similar terms are intended to be inclusive such that there may be additional elements other than the listed elements.

Additionally, where a method described above or a method claim below does not explicitly require an order to be followed by its steps or an order is otherwise not required based on the description or claim language, it is not intended that any particular order be inferred. Likewise, where a method claim below does not explicitly recite a step mentioned in the description above, it should not be assumed that the step is required by the claim.

What is claimed is:

1. An automated system for optimizing a single frequency network broadcast, comprising:
   a plurality of single frequency network transmitters that simultaneously broadcast a same time-synchronized signal over a same frequency to a coverage area;
   a plurality of remote monitoring stations distributed at multiple locations in the coverage area, each station having a network analyzer and a remote communication interface, the network analyzer being configured to conduct time and amplitude transmitter measurements from any of the network transmitters, and each remote communication interface being configured to transmit the transmitter measurements; and
   a network server having a network communication interface configured to request and receive the transmitter measurements from the remote monitoring stations, the network server being configured to identify, based on the transmitter measurements, at least one of the plurality of network transmitters as at least one interfering transmitter that is a source of time-delay signal reception for at least one of the remote monitoring stations.

2. The system of claim 1, wherein the network server is configured to recommend parameter changes to one or more of the network transmitters that will mitigate the time-delay interference of the at least one interfering transmitter.

3. The system of claim 1, wherein the network server is configured to:
   calculate a time adjustment based on the transmitter measurements to determine a transmitter launch delay; and
   communicate the transmitter launch delay to the plurality of network transmitters, except to the at least one interfering transmitter, associated with signal reception of at least one remote monitoring station, to mitigate the time-delay interference cause be the at least one interfering transmitter.

4. The system of claim 1, wherein the network server is configured to:
   determine an adjusted guard interval based on the transmitter measurements; and
   communicate the adjusted guard interval to the at least one interfering transmitter to mitigate the time-delay interference.

5. The system of claim 4, wherein the time adjustment for determining the adjusted guard interval is based on a comparison of a guard interval setting and the time measurement of the interfering transmitter.

6. The system of claim 1, wherein the network communication interface is configured to request and receive the transmitter measurements from the remote monitoring stations in real-time.

7. The system of claim 1, wherein the network analyzer of each remote monitoring station has a broadcast antenna.

8. The system of claim 7, wherein each remote monitoring station has a modem antenna.

9. The system of claim 8, wherein each remote monitoring station has a GPS antenna.

10. The system of claim 1, wherein the network server is configured to analyze trends in the transmitter measurements over time.

11. A method for optimizing a single frequency network broadcast, the network comprising single frequency network transmitters that simultaneously broadcast a same time-synchronized signal over a same frequency over a coverage area, the method comprising the steps of:
   measuring time and amplitude measurements from each of the network transmitters using a network analyzer of one or more remote monitoring stations distributed in the coverage area; and
   identifying, based on the time and amplitude measurements, at least one of the network transmitters as at least one interfering transmitter that is a source of time-delay interference in the signal reception of at least one of the remote monitoring stations.

12. The method of claim 11, further comprising the step of determining parameter changes to one or more of the network transmitters that will mitigate the time-delay interference of the at least one interfering transmitter.

13. The method of claim 11, wherein the step of measuring time and amplitude measurements from each of the network transmitters is done in real-time.

14. The method of claim 11, wherein the time and amplitude measurements from the remote monitoring stations are transmitted to a server of the network, which is configured to identify the interfering transmitter.

15. The method of claim 11, further comprising the step of distributing the remote monitoring stations at multiple locations in the coverage area.

16. The method of claim 11, further comprising the steps of:
   calculating a time adjustment based on the transmitter measurements to determine a transmitter launch delay; and
   communicating the transmitter launch delay to the plurality of network transmitters, except to the at least one interfering transmitter, associated with signal reception of at least one remote monitoring station, to mitigate the time-delay interference cause be the at least one interfering transmitter.

17. The method of claim 11, further comprising the steps of:
   determining an adjusted guard interval for the at least one of the network transmitters; and
   communicating the adjusted guard interval to the at least one interfering transmitter to mitigate the time-delay interference.

18. The method of claim 17, wherein the step of determining the adjusted guard interval includes the step of comparing a guard interval setting and the time measurement of the interfering transmitter.

19. The method of claim 11, further comprising the step of analyzing trends in the transmitter measurements over time.

20. The method of claim 11, wherein each of the remote monitoring stations includes a broadcast antenna.

* * * * *